(12) United States Patent
Porter et al.

(10) Patent No.: US 10,264,732 B2
(45) Date of Patent: Apr. 23, 2019

(54) HARVESTED BALE WRAPPING MATERIAL SHEETS

(71) Applicant: L.P. Brown Company, Inc., Memphis, TN (US)

(72) Inventors: Kenneth L. Porter, Hernando, MS (US); James L. Hayes, Senatobia, MS (US)

(73) Assignee: L.P. BROWN COMPANY, INC., Memphis, TN (US)

( * ) Notice: Subject to any disclaimer, the term of this patent is extended or adjusted under 35 U.S.C. 154(b) by 0 days.

(21) Appl. No.: 15/717,330

(22) Filed: Sep. 27, 2017

(65) Prior Publication Data

US 2018/0084729 A1    Mar. 29, 2018

Related U.S. Application Data

(60) Provisional application No. 62/400,460, filed on Sep. 27, 2016.

(51) Int. Cl.
*B65D 65/14* (2006.01)
*A01F 15/07* (2006.01)
*B65B 41/10* (2006.01)

(52) U.S. Cl.
CPC .... *A01F 15/071* (2013.01); *A01F 2015/0745* (2013.01); *B65B 41/10* (2013.01); *B65D 65/14* (2013.01)

(58) Field of Classification Search
CPC ........... A01F 15/071; A01F 2015/0745; B65D 65/14; B65B 41/10; Y10T 428/14
See application file for complete search history.

(56) References Cited

U.S. PATENT DOCUMENTS

| | | | |
|---|---|---|---|
| 1,231,382 | A | 6/1917 | Knee |
| 2,726,222 | A | 12/1955 | Palmquist et al. |
| 3,053,722 | A | 9/1962 | Petty |

(Continued)

FOREIGN PATENT DOCUMENTS

| | | | |
|---|---|---|---|
| AU | 2005300259 B2 | 5/2006 | |
| AU | 2008355557 B2 | 11/2009 | |

(Continued)

OTHER PUBLICATIONS

The United States Patent and Trademark Office; The International Search Report and Written Opinion of the International Searching Authority, or the Declaration; International Search Report and Written Opinion for PCT/US17/53748; dated Feb. 9, 2018; pp. 1-16; United States Patent Office; US.

(Continued)

*Primary Examiner* — Patricia L. Nordmeyer
(74) *Attorney, Agent, or Firm* — Wyatt, Tarrant & Combs, LLP; Stephen C. Hall (57) ABSTRACT

In a continuous roll of wrapping material for crops such as cotton or hay, the individual wrapping segments are arranged so that a permanent adhesive is protected until the point when this adhesive is to be exposed for securing a wrapping segment to itself, encircling a subject bale located in and harvested from a field, wherein the contiguous wrapping segments separate from each other either at a point of weakness associated with perforations and the like, or as overlaid segments that slidably come apart.

10 Claims, 10 Drawing Sheets

(56) References Cited

U.S. PATENT DOCUMENTS

| | | |
|---|---|---|
| 3,072,512 A | 1/1963 | Dalle |
| 3,150,029 A | 9/1964 | Ferrand |
| 3,162,393 A | 12/1964 | Gelleke |
| 3,349,765 A | 10/1967 | Blanford |
| 3,369,766 A | 2/1968 | Herman |
| 3,457,919 A | 7/1969 | Harbard |
| 3,735,865 A | 5/1973 | Smith |
| 3,746,607 A | 7/1973 | Harmon et al. |
| 3,942,713 A | 3/1976 | Olson et al. |
| 4,041,201 A | 8/1977 | Wurker |
| 4,050,121 A † | 9/1977 | Richman |
| 4,127,132 A † | 11/1978 | Karami |
| 4,201,352 A | 5/1980 | Madachy |
| 4,258,846 A | 3/1981 | Campo |
| 4,338,084 A | 7/1982 | Berthelsen |
| 4,343,132 A | 8/1982 | Lawless, Jr. |
| 4,349,163 A | 9/1982 | Wise |
| 4,416,392 A | 11/1983 | Smith |
| 4,605,577 A | 8/1986 | Bowytz |
| 4,688,368 A | 8/1987 | Honegger |
| 4,768,810 A | 9/1988 | Mertens |
| 4,778,701 A | 10/1988 | Pape et al. |
| 4,801,460 A | 1/1989 | Panza et al. |
| 4,917,928 A | 4/1990 | Heinecke |
| 4,941,882 A | 7/1990 | Ward et al. |
| 5,057,097 A | 10/1991 | Gesp |
| 5,080,254 A | 1/1992 | Feer |
| 5,221,393 A † | 6/1993 | Heutschi |
| 5,234,517 A | 8/1993 | Pape et al. |
| 5,324,078 A | 6/1994 | Bane |
| 5,365,836 A | 11/1994 | Campbell |
| 5,413,656 A | 5/1995 | Kuhnhold et al. |
| 5,496,605 A | 3/1996 | Augst et al. |
| 5,497,903 A | 3/1996 | Yoneyama |
| 5,520,308 A † | 5/1996 | Berg |
| 5,591,521 A † | 1/1997 | Arakawa |
| 5,646,090 A | 7/1997 | Tamura et al. |
| 5,660,349 A | 8/1997 | Miller et al. |
| 5,885,679 A | 3/1999 | Yasue et al. |
| 5,979,141 A | 11/1999 | Phillips |
| 6,008,429 A | 12/1999 | Ritger |
| 6,153,278 A | 11/2000 | Timmerman et al. |
| 6,295,758 B1 | 10/2001 | Weder et al. |
| 6,453,805 B1 | 9/2002 | Viaud et al. |
| 6,467,719 B1 | 10/2002 | Rodriguez |
| 6,514,585 B1 | 2/2003 | Pearson et al. |
| 6,550,633 B2 | 4/2003 | Huang et al. |
| 6,550,634 B1 | 4/2003 | Alegre De Miguel et al. |
| 6,632,311 B1 | 10/2003 | Glenna et al. |
| 6,644,498 B1 † | 11/2003 | Lemberger |
| 6,663,932 B2 | 12/2003 | McLaughlin et al. |
| 6,685,050 B2 | 2/2004 | Schmidt et al. |
| 6,756,096 B2 | 6/2004 | Harding |
| 6,787,209 B2 † | 9/2004 | Mass |
| 6,901,723 B2 | 6/2005 | Jordan et al. |
| 6,971,542 B2 | 12/2005 | Vogel et al. |
| 7,165,928 B2 | 1/2007 | Haverdink et al. |
| 7,541,080 B2 | 6/2009 | Mass et al. |
| 7,625,332 B2 | 12/2009 | Mass et al. |
| 7,636,987 B2 † | 12/2009 | Derscheid |
| 7,694,491 B2 | 4/2010 | Noonan et al. |
| 8,071,196 B2 | 12/2011 | Goering |
| 2002/0172792 A1 | 11/2002 | Jarvis et al. |
| 2002/0182367 A1 | 12/2002 | Salzsauler et al. |
| 2003/0000934 A1 | 1/2003 | Tanaka et al. |
| 2004/0121108 A1 | 6/2004 | Mass et al. |
| 2005/0034429 A1 | 2/2005 | Mass et al. |
| 2005/0155714 A1 | 7/2005 | Adams |
| 2007/0152010 A1 | 7/2007 | Denen et al. |
| 2007/0240389 A1 | 10/2007 | Frerichs |
| 2008/0245923 A1 | 10/2008 | Maddaleni et al. |
| 2009/0274881 A1 | 11/2009 | Mass |
| 2009/0302147 A1 | 12/2009 | Emoto |
| 2010/0237179 A1 | 9/2010 | De Matteis |
| 2011/0133015 A1 | 6/2011 | Gelli et al. |
| 2011/0309544 A1 | 12/2011 | Hupp et al. |
| 2011/0311749 A1 | 12/2011 | McNeil et al. |
| 2012/0148783 A1 † | 6/2012 | Kunkleman |
| 2013/0143001 A1 | 6/2013 | Manifold et al. |
| 2013/0221078 A1 | 8/2013 | Skelton |
| 2013/0248643 A1 | 9/2013 | Newhouse et al. |
| 2013/0320124 A1 | 12/2013 | Rochon et al. |
| 2014/0263590 A1 | 9/2014 | Skelton |
| 2014/0352263 A1 † | 12/2014 | Harchol |
| 2014/0370224 A1 | 12/2014 | Kien et al. |
| 2015/0030812 A1 | 1/2015 | Teal |
| 2015/0274483 A1 | 10/2015 | Newhouse et al. |
| 2016/0151994 A1 | 6/2016 | Castillo et al. |
| 2016/0177135 A1 | 6/2016 | Allen |

FOREIGN PATENT DOCUMENTS

| | | |
|---|---|---|
| EP | 1584574 A2 | 10/2005 |
| GB | 2233962 A2 | 1/1991 |
| WO | 9813636 A2 | 4/1998 |
| WO | 0061359 A2 | 10/2000 |
| WO | 0061359 A3 | 10/2000 |
| WO | 2015010151 A1 | 1/2015 |
| WO | 2015024052 A1 | 2/2015 |

OTHER PUBLICATIONS

The United States Patent and Trademark Office; The International Search Report and Written Opinion of the International Searching Authority, or the Declaration; International Search Report and Written Opinion for PCT/US2015/022330; dated Jun. 18, 2015; pp. 1-12; The United States Patent and Trademark Office; U.S.

U.S. Appl. No. 14/667,574, filed Mar. 24, 2015.
U.S. Appl. No. 14/106,536, filed Dec. 13, 2013.
U.S. Appl. No. 15/842,015, filed Dec. 14, 2017.

† cited by third party

HARVESTED BALE WRAPPING MATERIAL SHEETS

CROSS-REFERENCE TO RELATED APPLICATION

This nonprovisional utility application claims priority to and benefit from U.S. Provisional Application No. 62/400,460, titled "Harvested bale wrapping material sheets," filed on Sep. 27, 2016, which is hereby incorporated by reference in its entirety.

FIELD OF INVENTION

Harvesting of agricultural crops including hay and cotton is accomplished by a self-propelled machine that collects the crop and compresses it into successive bales. The current disclosure involves the arrangement and efficient deployment of self-adhering sheet material in individual segments, wherein the individual wrapping segments hold a bale together and isolate it from the weather/rain in the field until the bales may be collected for further processing.

BACKGROUND

Present embodiments are directed to sheets of wrapping material arranged in wrapping material segments. The segments are suitable for use in an agricultural baler to securely wrap harvested agricultural products. Such agricultural balers are described in U.S. Pat. No. 5,979,141, issued Nov. 9, 1999, and titled "Wrapping device for large round baler including holder for spare roll of web wrapping material." In the process of wrapping during the harvesting, a single wrapping segment securely encircles the bale to ensure protection against the elements in the field. Secondly, wrapping segments coming off as the roll unwinds are arranged to separate an active (first) wrapping segment from a second wrapping segment contiguous to the first wrapping segment. Prior wrapping materials include rolls of individual wrapping segments successively joined via elaborate Z-folds or laminates including multiple interacting adhesive layers to form an otherwise 'continuous roll' of segments, wherein the trailing end of each segment has an adhesive surface to seal the end of the wrap on the bale to the wrapping surface immediately beneath it. The intricacies of prior wrapping materials were meant to isolate the adhesive until the end of the process to prevent the adhesive from wrongly sticking to winding machinery in the winding cycle, or to dispensing rollers and other wrapping machinery during the wrapping cycle. The problem is particularly pronounced if loose edges entangle with the rubber dispenser rolls cylinders of the harvesting machine. Typically, it is not only the unpredictable movement of the wrapping material, but the energy produced when wrapping segments separate from each other that produces these undesirable effects.

Another problem is inherent in the idea of separating two contiguous wrapping segments that are on a roll. Even when a wrapping material is weakened along a parting line, which facilitates the separation during a wrapping cycle, the separation still generates significant force on the material. That is, a pulling force applied upon a first wrapping segment, which is opposed by a force (though not necessarily equal force) on a contiguous second segment, causes the two contiguous wrapping segments to split. Often, this force is very substantial, and it frequently creates undesirable distortions or uneven tension of the wrap as it is placed over some portion of a subject bale. This leaves the harvested item susceptible to uneven shaping or even uncovered portions and partially exposed to the elements. Or it might result in foldback of the wrapping material upon itself, resulting in possible interruption of service until the wrapping machinery on the self-propelled machine is detangled from the wrapping material. Thus, there is a need for wrapping material that is more easily and efficiently separated, to reduce problems associated with the separation force.

The current embodiments provide solutions to the problems noted above, and confer additional benefits in their use as discussed below.

SUMMARY OF EMBODIMENTS

Generally, the embodiments herein encompass a roll of continuous wrapping material provided around a cylindrical core including a plurality of successive wrapping segments with a first wrapping segment, a series of middle wrapping segments, and a last wrapping segment attached to said cylindrical core. The wrapping segments can be connected to each successive segment through periodic separable connections, wherein each of said wrapping segments has a leading section, a trailing section, and a body section therebetween, wherein said wrapping segment leading section extends from a leading end to said body section. The core is typically a cardboard or plastic cylinder of a certain diameter in order to allow unwinding of the wrap material at desired rates and distances.

Also included herein is a roll of wrapping segments as described above, wherein a separation occurs that exposes an otherwise protected permanent adhesive, where the separation occurs either by what is referred to herein as an angular peel (e.g., perpendicular), or a rotational peel, or by an overlay between two wrapping segments, such that one wrapping segment slips out from under another. The exposed permanent adhesive will then adhesively secure a trailing end of the wrapping segment to the leading end after the wrapping segment has encircled a bale, thus completing the wrapping of the harvested item. Also encompassed within the scope of embodiments are methods of forming a roll for wrapping, as well as the wrapping itself, of at least one solid object (such as, without any limitation intended, an agricultural bale, like cotton). The apparatus and methods of the present embodiments are for use within a wrap application device (such as, again, without any limitation intended, a harvesting device or baler), utilizing at least one wrapping segment of the inventive wrapping material rolls as described herein.

Such wrapping materials are typically synthetic materials such as polyethylene formed as mesh, film, fabric, composites, and the like, wherein the wrapping material is formed of contiguous segments as a web. Other features and improvements include the ability, through proper configuration designs, to produce a smooth separation between contiguous wrapping segments that provides a more refined and controlled movement patterns as the bale is wrapped. The ability to reduce or eliminate flapping and/or recoil as the wrapping segment separates from the overall web provides more desirable wrapping features around a bale and overall improved results. Because of the easier-to-separate wrapping segments afforded by the present embodiments, the wrapping material is less prone to tearing, tangling, and unwrapping once it has wound around a bale. Further, a reduced incidence of recoil lowers the chances of the wrapping material becoming tangled with the dispensing machinery or other parts of the agricultural baler.

These and additional benefits are thus supplied for improved versatility and utility of the subject wrap materials.

FIGURES

The drawings, schematics, figures, and descriptions contained herein are to be understood as illustrative of steps, structures, features and aspects of the present embodiments and do not limit the scope of the embodiments. The scope of the application is not limited to the precise arrangements or scales as shown in the figures.

MULTIPLE EMBODIMENTS AND ALTERNATIVES

There are at least two general considerations for present embodiments involved with wrapping bales of harvested material. First, one must successfully place a plurality of releasably attached wrapping segments on a roll so they will be removed in succession as the roll rotates. This can be thought of as the manufacturing phase. Second, what is on the roll will be dispensed, one wrapping segment at a time, and each wrapping segment in turn encircles a different bale of harvested material. The wrapping cycle is completed with proper exposure of adhesive found at a trailing end of a wrapping segment so the segment will adhere to itself once it is wound around a bale.

For the first consideration, the roll is formed by placement of wrapping segments rotationally around a core, which can be cylindrical, preferably with at least a section of a first wrapping segment adhered to the core. Upon proper contact and adhesion to the core, suitable tension levels are supplied for proper and reliable unwinding of the wrapping segments from the roll until the final wrapping segment (i.e., first wrapping segment added to the core, last segment to be dispensed) is available to sufficiently wrap the subject round bale. Once the final segment of wrapping material comes off the core, then all that remains is the wrap material core—usually with a slight amount of adhering material on the surface of the core—allowing a user to simply remove the empty core and replace it with a full roll of wrap material around a central core for further utilization in the field. The empty core may then be easily discarded upon removal from the harvesting machine. The adhesion of the wrap material to the core can be accomplished by products such as hook and loop or adhesives with sufficient holding force albeit that allow the closest wrapping segment to the core to still be released as the roll is unwound.

Additionally, however, the end structure of the first wrapping segment around the core (i.e., last wrapping segment off the core) can actually be wound tightly against itself around the core, without utilizing any adhering product in contact with the core. If done properly in this manner, the wrapping segments will still unwind and properly expose the permanent adhesive on the trailing end of each segment for application to the wrap around the bale. In general, the goal is to prevent unwanted slippage of the wrapping material from the core while still exhibiting a suitable low level of adhesion such that unwrapping does not require inordinately high pulling forces from the harvesting device during utilization.

For the second consideration, and now with reference to FIGS. 1-8, generally, a wrapping material according to multiple embodiments herein as well as their alternatives is illustrated. Such wrapping materials are provided in an elongated sheet. In some embodiments, the sheet is arranged as a continuous series of wrapping segments, which are separable and otherwise stored consecutively on a reel or a core. Such a wrapping material, as described above, may be utilized for use in wrapping of solid objects, in particular, for the advantageous features described herein, as it relates to agricultural products, such as cotton, and may be composed of one or more of a variety of materials including, without limitation, polyolefin (e.g., polyethylene) films, polyolefin nettings, mesh, and woven or fibrous materials.

The width of such a wrapping material should be sufficient to cover the cylindrical length of the subject bale or other item being wrapped with a thickness sufficient to withstand the elements of nature if left in an agricultural field for a period of time surrounding a subject bale. Generally, and in non-limiting fashion, the thickness of a suitable agricultural wrapping material substrate is from about 40 to about 120 microns and the length of a wrapping segment is from about 15 to about 25 meters, depending upon the harvested material. It is desirable, though not required, for the length of such a wrapping segment to be sufficient to accommodate a range of modules at least from 50 inches to 94 inches in diameter.

In some embodiments, each wrapping segment has a "chevron" shape with a pointed outward structure utilized forward near the leading end, and the trailing end exhibiting an inwardly pointed inverse structure relative to the opposite leading end. The length and slope of the chevron portion shall have a fairly wide range of suitable angles, and the exact dimensions are non-limiting. This type of geometric shape, and its benefits, are described in U.S. application Ser. No. 14/667,574, published as U.S. Publication No. 20160280404, titled "WRAPPING MATERIALS FOR SOLID OBJECTS" filed Mar. 24, 2015, the full contents of which for this feature are incorporated herein by reference.

It would be well understood by the ordinarily skilled artisan that such an inventive wrapping material as described herein is scalable to any desired size for different types of wrapped materials. For the baling process, sufficient wrapping material is contained on a supply reel or core to yield a field supply roll of sufficient wrapping segments for harvesting a multiplicity of round bales. The amount of wrapping material on the supply roll is sometimes limited to the capacity of the harvesting machine in terms of the storage space and technological capabilities of said harvesting machine. With that basic background provided, the embodiments may be better understood with the following descriptions and explanations, particularly as the inventive wrap and method of utilization thereof accords significant improvements over prior approaches.

FIG. 1 illustrates an approach to providing a wrapping material for wrapping a harvested item, wherein the folded over part that protects the adhesive is part of the same wrapping segment as the permanent adhesive itself. Protected in relation to a permanent adhesive is thought of as having a boundary formed around the permanent adhesive before a defined point in the unwinding process, and thus to isolate the permanent adhesive in this way. This makes it so the permanent adhesive does not come in contact with proximal portions of the wrapping segment that it is not intended to adhere to, or the wrapping equipment itself, in an undesirable way. As the wrapping cycle unfolds, the permanent adhesive should come in contact with another portion of the wrapping segment where adhering of the segment to itself occurs, and protecting the permanent adhesive with a removable fold or overlay facilitates this.

Both the protecting folded over part and the permanent adhesive are located forward of the perforation, i.e., between a separation point of weakness between two wrapping segments, such as a perforation, and the leading end of a leading wrapping segment. In some embodiments, the fold comes apart by what is referred to herein as an angular peel to separate the elements of the adhesive matrix, followed by separation of the two contiguous wrapping segments at the perforation formed between them. Optionally, during manufacture the web of wrapping segments undergoes scoring, dotting, placing slits, perforations, puncturing, and other similar manipulations at regularly spaced intervals, hereafter referred to generally as perforation 15. Accordingly, in some embodiments, contiguous wrapping segments are set off by spaced transverse lines where the material is broken for predictable separation during a wrapping cycle, thus creating contiguous wrapping segments by producing natural separation points of weakness within the web. Also, this facilitates the separation of segments through application of a pulling force on a leading wrapping segment and an opposing (not necessarily equal) force on a trailing wrapping segment.

Figure 1A:
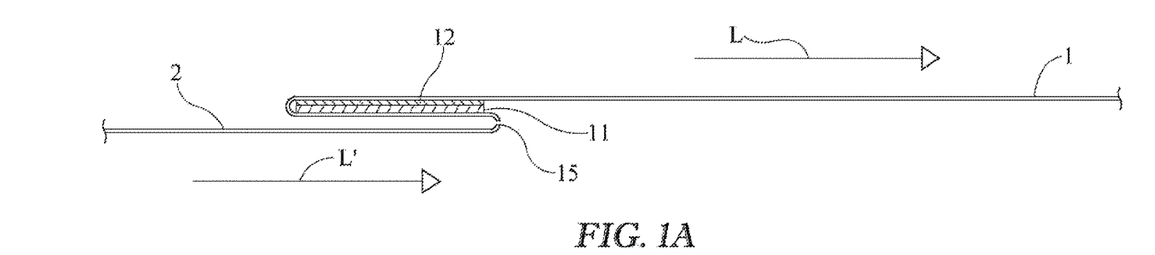
FIGS. 1A-C offer a perspective view illustrating in a progressive manner an active first wrapping segment and a contiguous second wrapping segment undergoing separation wherein the permanent adhesive located at a trailing end of the active wrapping segment becomes exposed, according to multiple embodiments and alternatives.

In some embodiments, a wrapping material is formed as contiguous segments. FIG. 1A illustrates a fold at a trailing end of a single wrapping segment, between the perforation and the leading end of the wrapping segment, and otherwise apart from the perforation that serves to separate the two wrapping segments as the wrapping material is dispensed from the roll. Accordingly, FIG. 1A illustrates permanent adhesive 11 as sandwiched between two surfaces of the wrapping segment at its trailing end. This protects the permanent adhesive from unwanted sticking to other parts of the web or the dispensing machinery until it is time for the permanent adhesive to be deployed later during the unwinding phase.

Figure 1B:
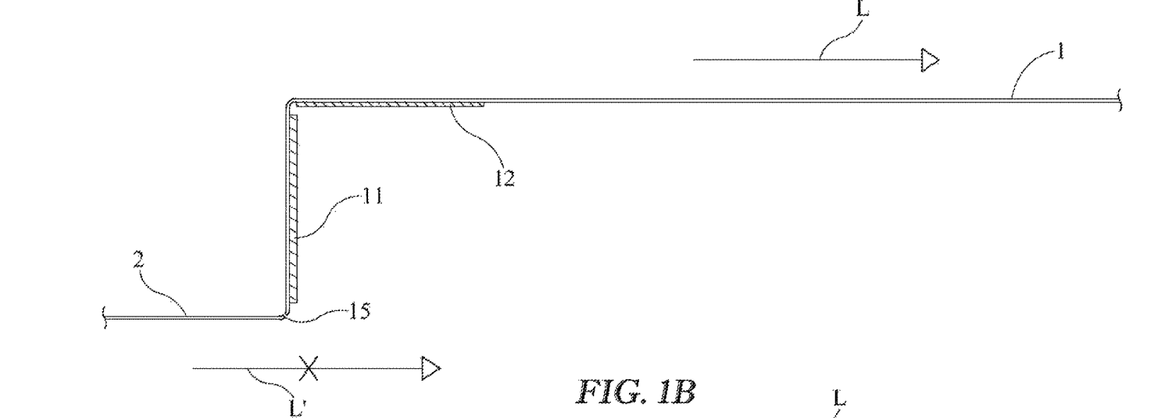

Next, FIG. 1B illustrates there is an angular peel force which is separating permanent adhesive 11 from release layer 12, which may result in the layers 11 and 12 being perpendicular orientation to one another. The separation that occurs between these layers exposes the permanent adhesive so it can make the wrapping segment adhere to itself. In some embodiments, release layer 12 is formed with a non-stick treatment applied to the wrapping segment, so the permanent adhesive 11 separates smoothly from the release layer, without tearing and catching the wrapping material. In this way, release layer 12 serves as a temporary covering for permanent adhesive 11. This covering remains in place until permanent adhesive 11 is deployed for a wrapping cycle as the wrapping segment is dispensed from the roll.

Figure 1C:
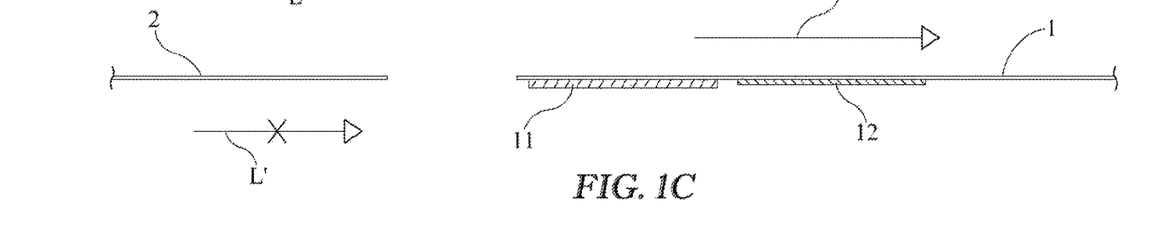

In some embodiments, a force needed to separate permanent adhesive 11 from release layer 12 is generated by a clutch/brake mechanism as discussed herein and in the published application incorporated by reference. This separation of the permanent adhesive 11 from release layer 12 occurs prior to, or with, the separation achieved between the contiguous wrapping segments as seen in FIG. 1C. Some wrapping material substrates may release from the adhesive as a function of their particular chemical makeup, such as the presence of low coefficient of friction polymers including silicone, Teflon™ (polytetrafluoroethylene or PTFE), impregnated substrates, or textured portions that reduce total area of contact between folded material. Alternatively, the substrate forming the wrapping segment has the release layer integrally added in a location selected by a user, for example by treating the substrate with a non-stick material (such as a silicone-containing coating, wax, or Teflon™ (polytetrafluoroethylene or PTFE)) to lower the coefficient of friction.

Figure 3A:
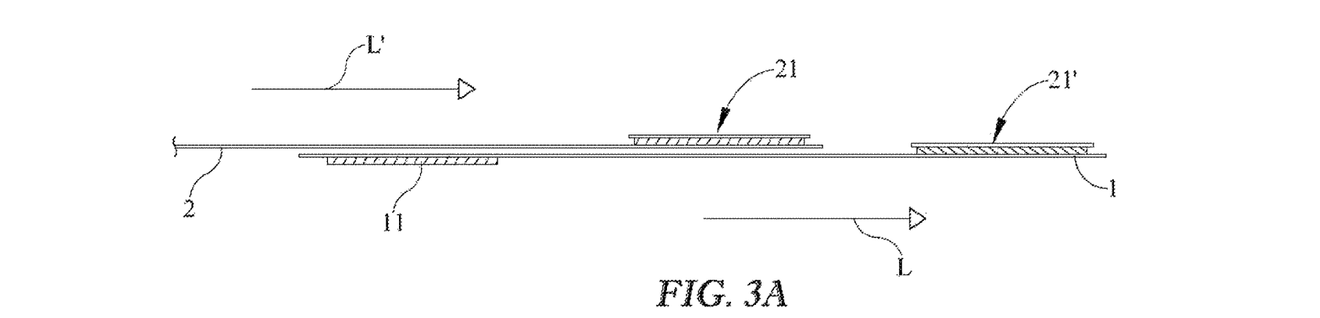
FIGS. 3A-C offer a perspective view illustrating an alternative embodiment, showing a progression of an active first wrapping segment and a contiguous second wrapping segment undergoing separation wherein the permanent adhesive located at a trailing end of the active wrapping segment becomes exposed, according to multiple embodiments and alternatives.
Figure 3B:
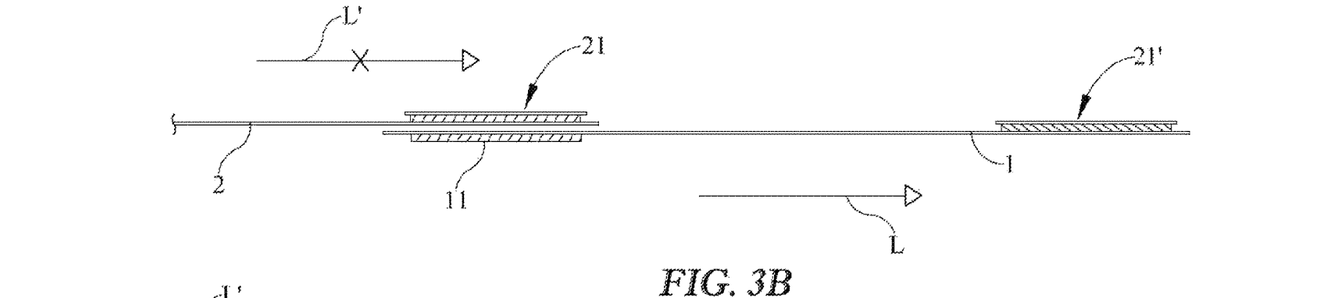
Figure 3C:
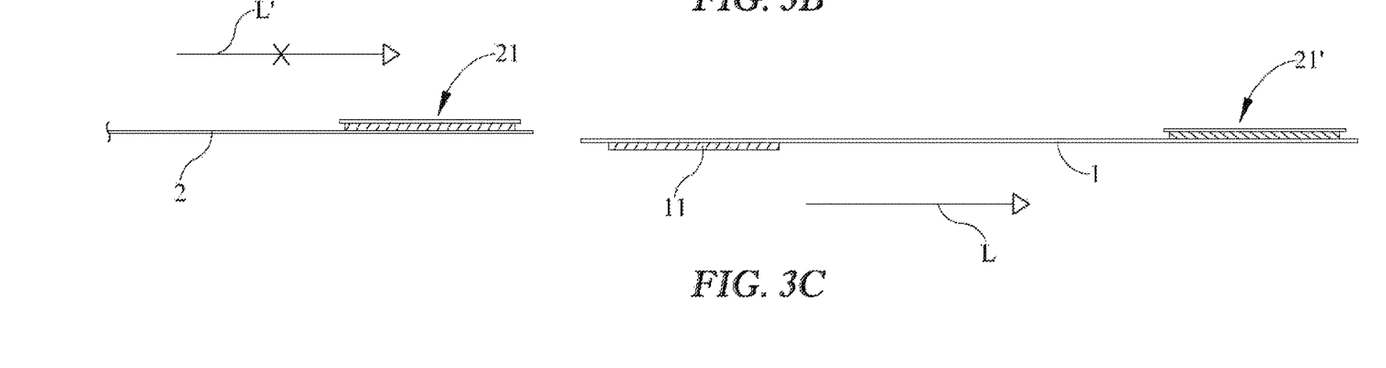

The formation of a release layer 12 integrally with the wrapping segment allows the release layer in contact with permanent adhesive 11 to release and separate, thereby exposing the permanent adhesive for the wrapping cycle. In some embodiments, release layer 12 is integral with the substrate forming the wrapping segment. In some embodiments, such as illustrated in FIGS. 3A-3C, release matrix 21 performs the same function as an integral release layer 12, and this matrix comprises adhesive coating 23 attached to a surface of the wrapping segment with release liner 24 attached to the wrapping segment with the adhesive coating 23, or thermally attached, rather than being formed integral with it. Release liner 24 can be a generally planar material formed from known low friction materials including silicone and Teflon™ (polytetrafluoroethylene or PTFE).

The release liner 24 according to this alternative approach protects the permanent adhesive from sticking to the wrapping material until it is ready to be deployed, and then allows the permanent adhesive to separate and be exposed toward the end of the wrapping cycle. The disclosures herein are meant to apply broadly, whether to a fold with angular peel as discussed and shown in FIG. 1A-C, or with rotational peel as in FIG. 2A-C, or with an overlay approach as in FIG. 3A-C, or with a split matrix approach as in FIG. 4A-C.

Returning now to FIGS. 1C and 1D, the trailing end of the wrapping segment is generally regarded as the last portion of the wrapping segment to leave the roll, while the leading end 17 is generally regarded as the first portion of the wrapping segment to encounter the bale. Separation may occur by the activation of a clutch/brake mechanism (not shown), which produces a speed differential between any two contiguous wrapping segments. For example, a second wrapping segment, nearer the core in relation to a first wrapping segment, may be stopped entirely, or otherwise slowed, relative to the speed of the first wrapping segment, as the first wrapping segment continues in motion toward the subject bale. The speed differential between the first and second wrapping segments facilitates the separation of the two contiguous segments, for example at their point of weakness, when a perforation is used to separate the wrapping segments. Alternatively, slidable separation occurs between two wrapping segments arranged without a perforation between them. Such a clutch/brake mechanism is described in U.S. application Ser. No. 14/667,574, published as U.S. Publication No. 20160280404, titled "WRAPPING MATERIALS FOR SOLID OBJECTS" filed Mar. 24, 2015, the full contents of which for this feature are incorporated herein by reference.

In the progressions of FIG. 1A-C, permanent adhesive 11, at a trailing end of a first wrapping segment 1, is exposed so it will adhere proximal to the leading end of the same wrapping segment. Upon separation, the wrapping segment encircles the bale, then secures itself around the bale with the permanent adhesive. That is, the permanent adhesive 11 is facing the bale and otherwise positioned at the trailing end. Thus, the trailing end adheres or attaches itself securely to a surface of the wrapping segment which is facing outward from the bale generally at the leading end of the wrapping segment. Having the trailing end attach to the leading end in this way generally reduces waste, although longer segments (or smaller diameter bales) could also produce this attachment of the trailing end to the mid-section of the wrapping material. Following the separation between two contiguous wrapping segments, the segment which is first off the roll during unwinding (or last on the roll during winding) completes the full wrap around the bale, while the other contiguous wrapping segment following in line is prepared to come off the roll in the same fashion, wrapping around the next bale to be formed by the machine in the field, and self-attaching as explained herein.

Thus, as the wrapping material moves from left to right in FIGS. 1A-C, this would be associated with the core rotating in a direction associated with unwinding the segments off of the core. At first, permanent adhesive 11 remains attached to, and otherwise protected by, the wrap material as in FIG. 1A near a trailing end of the wrapping segment. This is followed by the progression shown in FIG. 1B, where the exposed permanent adhesive 11 remains attached to the wrapping segment, placing it in a position where the permanent adhesive enables the wrapping segment to adhere to itself. Thus, the adhering of the wrapping segment around the agricultural product occurs when permanent adhesive 11 contacts and secures that trailing end portion of the wrapping segment to another portion of the same wrapping segment, usually at or near the leading end, as the wrapping segment encircles the harvested bale. In this way, the wrapping segment is secured around at least a portion of the harvested agricultural item, but customarily with the ends left open (uncovered).

Figure 2A:
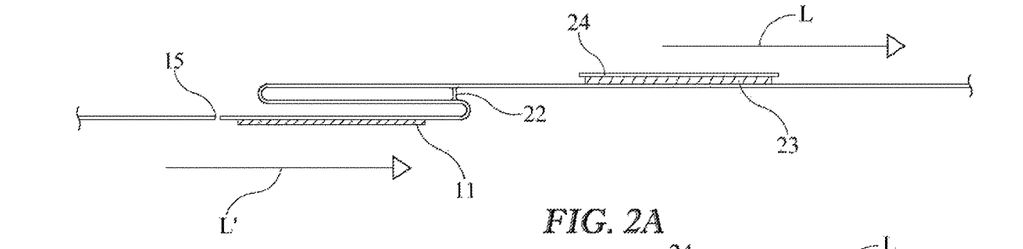
FIGS. 2A-C offer a perspective view illustrating an alternative embodiment, showing a progression of an active first wrapping segment and a contiguous second wrapping segment undergoing separation wherein the permanent adhesive located at a trailing end of the active wrapping segment becomes exposed, according to multiple embodiments and alternatives.
Figure 2B:
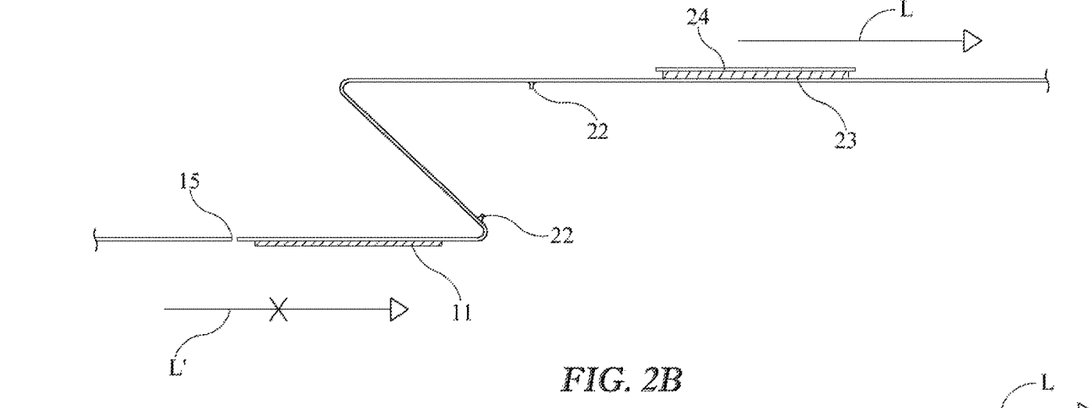
Figure 2C:
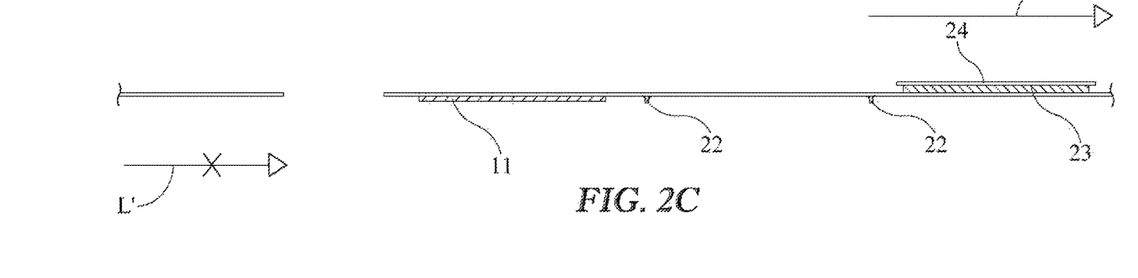

As with FIGS. 1A-C, FIGS. 2A-C are illustrated as if the wrapping segments are coming off a roll during the unwinding/wrapping phase, except the permanent adhesive is not sandwiched inside a fold between two portions of a single wrapping segment. Rather, the fold is oriented with the adhesive on the outside and the fold coming apart through a rotational unspooling as the segment travels linearly from left to right as represented on the drawing sheet. Similar to FIGS. 1A-C, the portion of wrapping segment 1 that protects permanent adhesive 11, and the permanent adhesive itself, are located between the perforation and the leading end of the wrapping segment. As desired, one or more optional breakable tabs 22 is provided in the fold, to mark the place of the fold and to facilitate unfolding as shown in FIG. 2B and marked by the release of permanent adhesive 11 from within the fold.

Figure 4A:
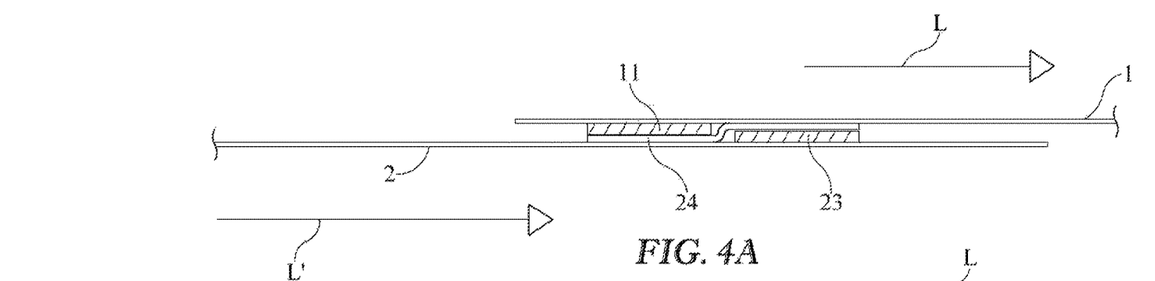
FIGS. 4A-C offer a perspective view illustrating an alternative embodiment, showing a progression of an active first wrapping segment and a contiguous second wrapping segment undergoing separation wherein the permanent adhesive located at a trailing end of the active wrapping segment becomes exposed, according to multiple embodiments and alternatives.
Figure 4B:
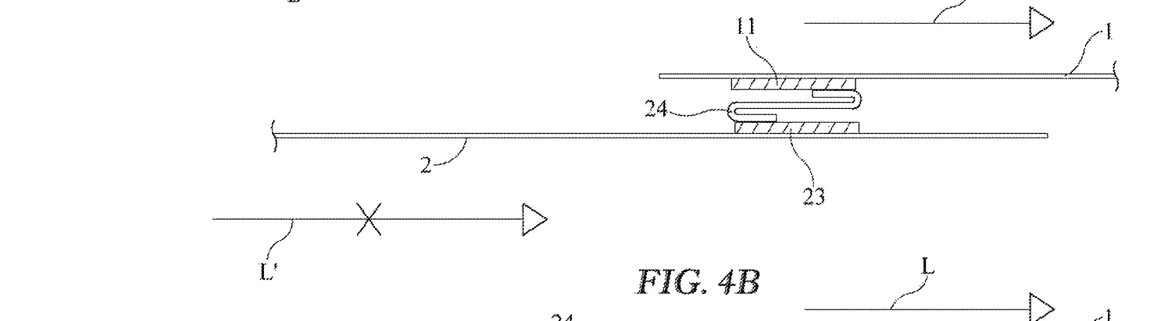

In some embodiments, a linear speed differential between two contiguous wrapping segments, such as segments 1 and 2, respectively in FIGS. 2B, 3B, and 4B, is produced by a clutch/brake mechanism as discussed above. With the speed differential, the first wrapping segment begins to unfold, exposing permanent adhesive 11 used for securing the wrapping material around the bale. In some embodiments, permanent adhesive 11 is located toward the trailing end of the wrapping segment on a surface of the wrapping segment facing inward toward the subject bale. In turn, release matrix 21 which facilitates the releasable joinder of contiguous wrapping segments during manufacture will be facing away from the core of the roll and not involved in the joining respective ends of wrapping segment 1.

Figure 1D:
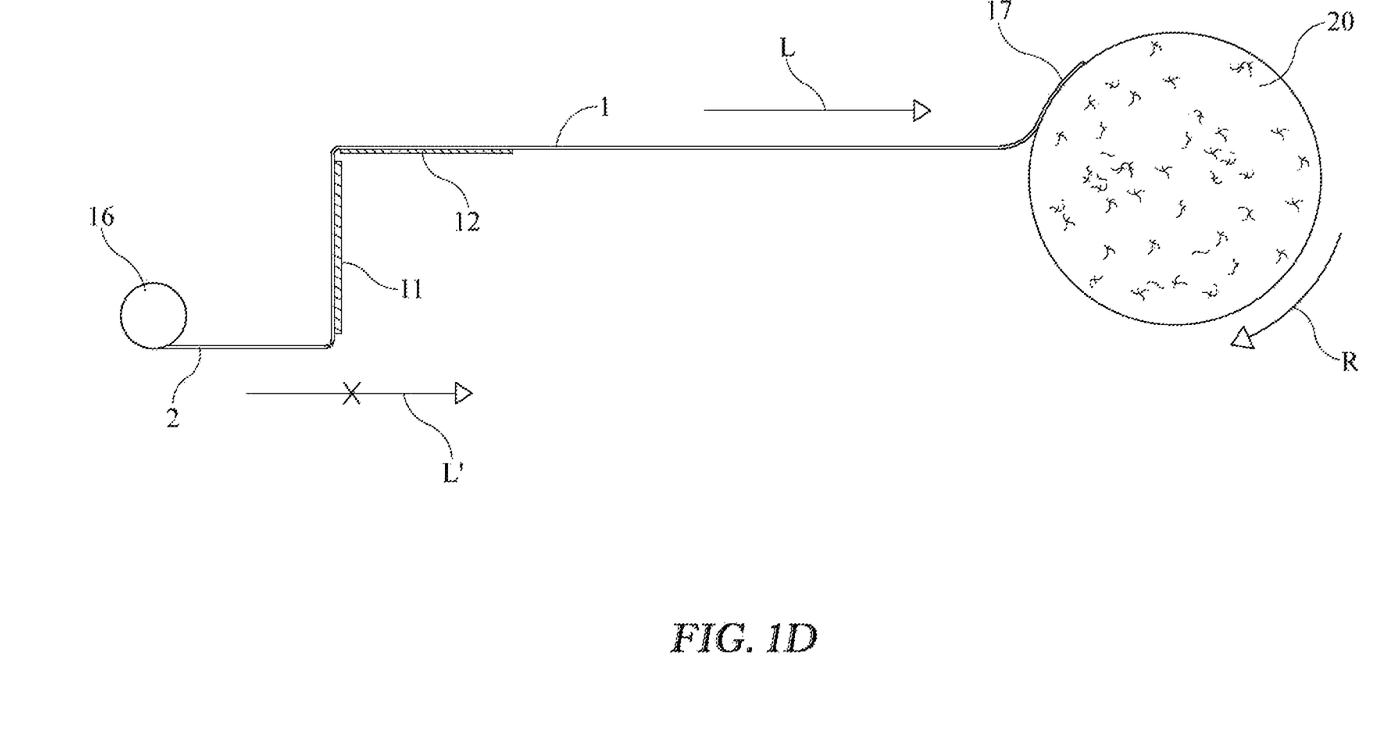
FIG. 1D is a schematic view of a wrapping cycle involving a plurality of wrapping segments, arranged in accordance with FIGS. 1A-1C, according to multiple embodiments and alternatives.
Figure 2D:
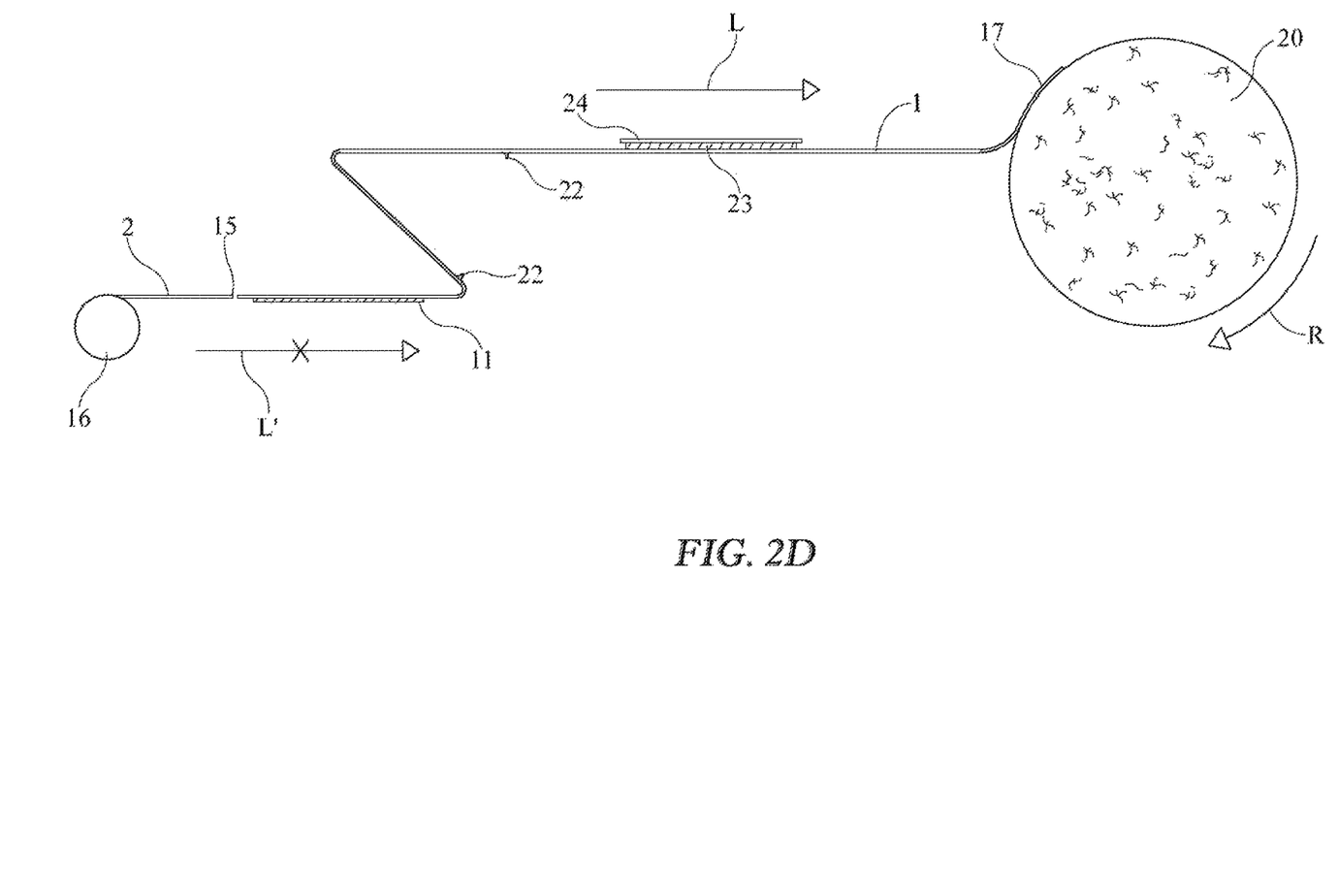
FIG. 2D is a schematic view of a wrapping cycle involving a plurality of wrapping segments, arranged in accordance with FIGS. 2A-2C, according to multiple embodiments and alternatives.

FIGS. 1D and 2D offer schematic views of a wrapping cycle, according to multiple embodiments and alternatives. A plurality of wrapping segments, 1, 2 and so forth, are arranged around core 16. As core 16 rotates to dispense wrapping material, each wrapping segment progresses as denoted by directional arrow L, toward harvested material 20, having been arranged in a cylindrical orientation by a picker as known in the art, and being rotated as denoted by arrow R. In some uses, a conventional picker is equipped with roll cylinder 19 that positions a leading end 17 of wrapping segment 1 proximal to the harvested material 20 so it can encircle said harvested material. As desired, a non-stick substance is coated on cylinder 19 to prevent interference with any adhesive material it may contact from the wrapping segment. In these figures, a speed differential of wrapping segment 2 relative to the active wrapping segment 1 is denoted by directional arrow L', in which a small x indicates that wrapping segment 2 either stops entirely along its linear path of travel, or is slowed down by some mechanism, such as a clutch/brake mechanism, again facilitating the separation of two wrapping segments. Similar principles would apply when wrapping segments are arranged to slidably release from one another, as opposed to separating at a point of weakness such as perforation 15.

In some embodiments, such as shown in FIGS. 3A-C, the separation between two contiguous wrapping segments occurs without the use of perforations. Still, like FIGS. 1 and 2, this results in a permanent adhesive 11 being exposed for adhering the trailing end of a wrapping segment to itself in relation to a leading end of the same segment around a subject bale. Unlike FIGS. 1 and 2, this approach utilizes an overlay between two contiguous wrapping segment, so no perforation is needed. Otherwise, FIG. 3 is similar to a rotational-type of peel where contact between two contiguous wrapping segments is completed as they are added to a rotating core during manufacture, and the separation happens as the core rotates the opposite direction during an unwinding/wrapping cycle.

As shown in FIG. 3A-3C, the left side of the sheet would be closer to the core of the roll, and as the progression of FIG. 3A to FIG. 3C occurs, the wrapping segments are represented as moving from left to right on the drawing sheet, in the direction of the subject bale to be wrapped. A first wrapping segment 1 has a permanent adhesive 11, at or proximal to its trailing end closer to the core and further from the subject bale. Likewise, a second wrapping segment 2 is seen with release matrix 21 positioned proximal to its leading end. The overlay exists because a portion of the first wrapping segment and a portion of the second wrapping segment occupy the same horizontal space—part of one wrapping segment atop part of another—as the unwinding occurs. As illustrated in FIG. 3A, the two overlaid segments are shown traveling in a direction from left to right toward the subject bale, that is, during an unwinding/wrapping phase. Based on automated features of the wrapping system, the brake/clutch mechanism as discussed with earlier figures is employed to create the aforementioned linear speed differential between the first wrapping segment compared to the contiguous second wrapping segment, causing the separation of the wrapping segments. Thus, the first wrapping segment separates from, that is slidably releases by slipping away from, the second wrapping segment. The result is shown in FIG. 3C, following complete separation of the wrapping segments.

An advantage of slidable separation is avoiding any tearing of the wrapping material forming the substrate of the wrapping segments. Regardless of steps used to reduce the energy associated with separation at a perforation, the fact remains that under the forces encountered during operation, separating two contiguous wrapping segments that are releasably joined at a perforation causes recoil, produces irregularities in the wrapping material that can become snagged, and often results in an uneven covering of the agricultural item. Accordingly, having two wrapping segments slidably separate rather than breaking their bond at a point of weakness entails less energy and provides a more consistent wrapping operation from one wrapping cycle to the next.

During use, as the diameter of the wrapping material on the roll decreases, the placement distance between release layer 12 and the permanent adhesive 11 also decreases. Thus, FIG. 3A shows an optional configuration that utilizes release matrices 21 in two locations: one location for release matrix 21 on second wrapping segment 2 and a second location for release matrix 21' on first wrapping segment 1. This optional configuration demonstrates that the placement of release layers and release matrices can be either on the first or second wrap segments. One result of this is to provide flexibility to the manufacturer depending on the size of the diameter of the roll of wrap material at the particular stage of manufacturer/winding. For example, for wrapping segments closer to the core (placed on the core at a relatively early stage of manufacture), having the releasable layer 12 arranged according to embodiments described herein protects the permanent adhesive 11 from contacting the wrapping material. However, as more and more sheets come off, and overall roll diameter decreases, the spacing is such that the releasable layer is shown in the relative position of matrix 21. In these instances, the releasable layer could also be a treated portion of the wrapping material as discussed above, which allows for low friction and easier release of the permanent adhesive 11 as it separates from the roll, or it could be a planar material with non-stick properties attached to the wrapping material surface as through thermal treatment or other methods and techniques known to the skilled artisan.

Figure 4C:
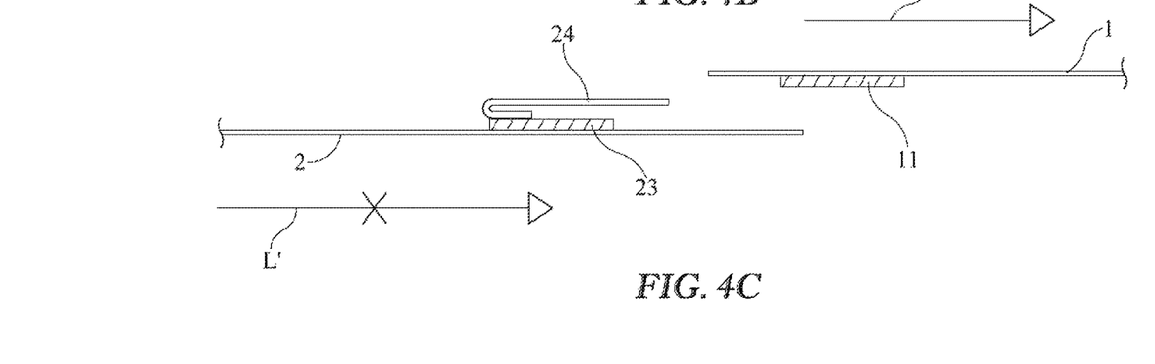

As shown in FIGS. 4A-4C, wrapping segments 1, 2 are overlaid in a slidably releasable arrangement, as opposed to being separable at a point of weakness between them such as with perforation 15 in FIGS. 1A-1C and FIGS. 2A-2C. Permanent adhesive 11 is located on a surface at or proximal to a trailing end of wrapping segment 1. This surface upon which the permanent adhesive is located will be considered as facing the bale of harvested material to be wrapped as in FIGS. 1D, 2D. In turn, the permanent adhesive 11 will securely attach to an opposite surface of wrapping segment 1 at the end of a wrapping cycle. FIGS. 4A-C likewise illustrate second wrapping segment 2, having attached thereon an adhesive coating 23 that adheres to hold in place a portion of a release liner 24. It will be appreciated that a portion of release liner 24 is unattached to the adhesive coating 23, leaving the release liner with a free, unattached portion.

In the manufacturing process, a split matrix is formed wherein the free, unattached portion of release liner 24 is separably positioned between the permanent adhesive 11 of the first wrapping segment 1 and a surface of the second wrapping segment 2. As the progression continues, segments 1, 2 slide and release from each other. The speed differential is denoted by arrow L' associated with the reduction in speed of wrapping segment 2, while wrapping segment 1 travels at a different linear rate denoted by arrow L. FIG. 4B shows the separation of the split matrix where the portion of liner 24 separably attached to permanent adhesive 11 begins to peel away from the permanent adhesive. FIG. 4A shows the segments fully separated with a portion of release liner 24 still attached to second wrapping segment 2 by the adhesive coating 23, and another portion of release liner 24 unattached and free to move or "float" along the unattached portion. FIG. 4C also shows permanent adhesive 11 of wrapping segment 1 exposed at the trailing end of that wrapping segment. Permanent adhesive 11 is now prepared to complete a wrapping cycle when a leading end of wrapping segment 1, the end further from the core coming off of a roll, encircles a bale of harvested material 20 as shown in FIGS. 1D, 2D.

Figure 5A:
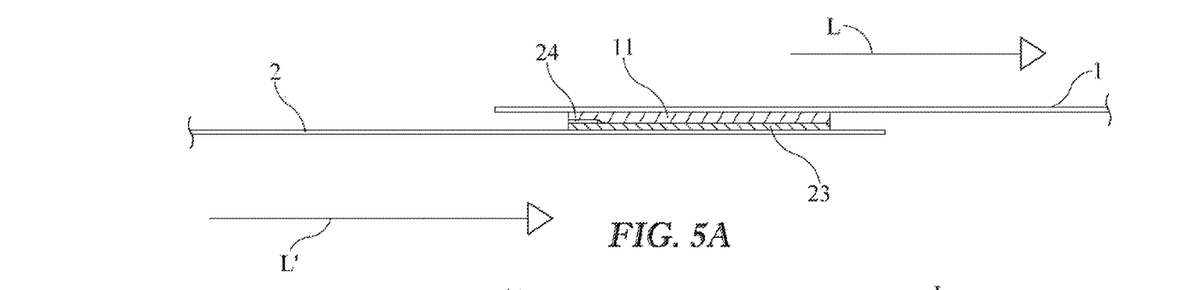
FIGS. 5A-C offer a perspective view illustrating an alternative embodiment, showing a progression of an active first wrapping segment and a contiguous second wrapping segment undergoing separation wherein the permanent adhesive located at a trailing end of the active wrapping segment becomes exposed, according to multiple embodiments and alternatives.
Figure 5B:
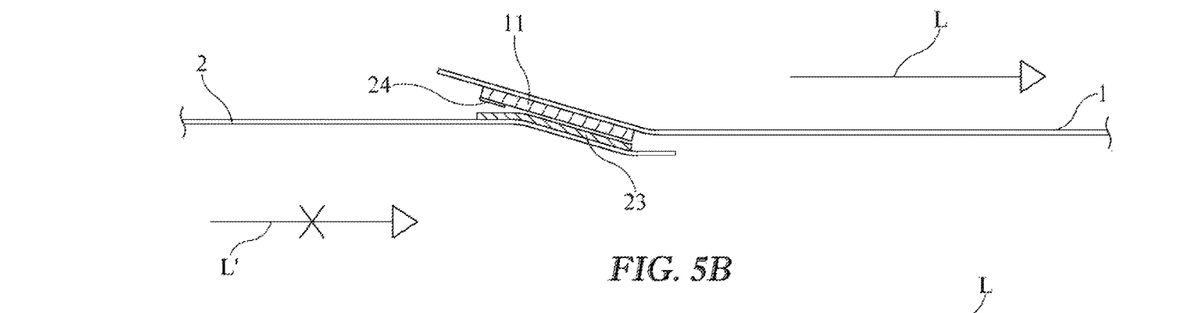
Figure 5C:
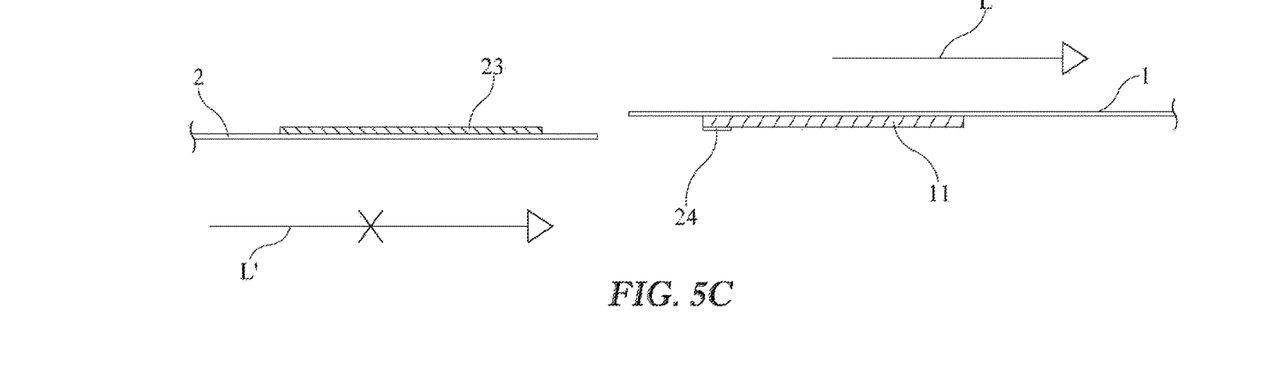

Another variation of angular peel is shown in FIGS. 5A-C, the operative structures of other figures (e.g., permanent adhesive 11, adhesive coating 23, and wrapping segments 1, 2) are arranged for the permanent adhesive to be exposed once the two wrapping segments slidably separate. In some embodiments as shown here, as the segments 1, 2 begin to separate as shown in FIG. 5B, the permanent adhesive 11 and adhesive coating 23 peel away from each other, aided by the presence of release liner 24 positioned between them. In some embodiments, release liner 24 is shorter than the permanent adhesive attached to the substrate, as the liner in this context serves to begin the separation of the permanent adhesive 11 from the adhesive coating 23. Upon separation of permanent adhesive 11 from adhesive coating 23, it leaves the permanent adhesive 11 exposed at the trailing end of wrapping segment 1 as shown in FIG. 5C.

In some embodiments, as illustrated in FIGS. 4A-C and FIGS. 5A-C, there is no permanent adhesive, no matrix, and no release layer or adhesive bonding at the actual leading end nor at the trailing end of wrapping segments 1, 2. In this context, these ends refer to where an edge of the wrapping substrate material is found at either of its length-wise ends. Instead, an area of substrate material uncovered by adhesive, matrix, and distance forms a non-adhesive area over some distance (i.e., a non-adhesive distance where no bonding occurs) extending from both of these edges of each wrapping segment. In non-limiting fashion, this non-adhesive distance extending from edges at the respective leading end and trailing end may be about 4-36 inches, and results in there being no bonding occurring at the lateral edges of a wrapping segment. This area, proximal to the edges, yet uncovered by permanent adhesive, matrix, release layer, or adhesive coating, is advantageous in that it avoids adhesive extending to the edges, which can prevent good separation of the permanent adhesive. Instead, as seen in FIG. 5B by way of example, the uncovered area facilitates the separation by establishing a portion of wrapping segment unconnected to any other structure. In this way, present embodiments avoid a significant challenge and limitation of systems that utilize some form of adhesive extending to the edge, where the near-edge, adhesive-covered area has greater exposure for sticking to moving pieces of equipment.

Figure 6:
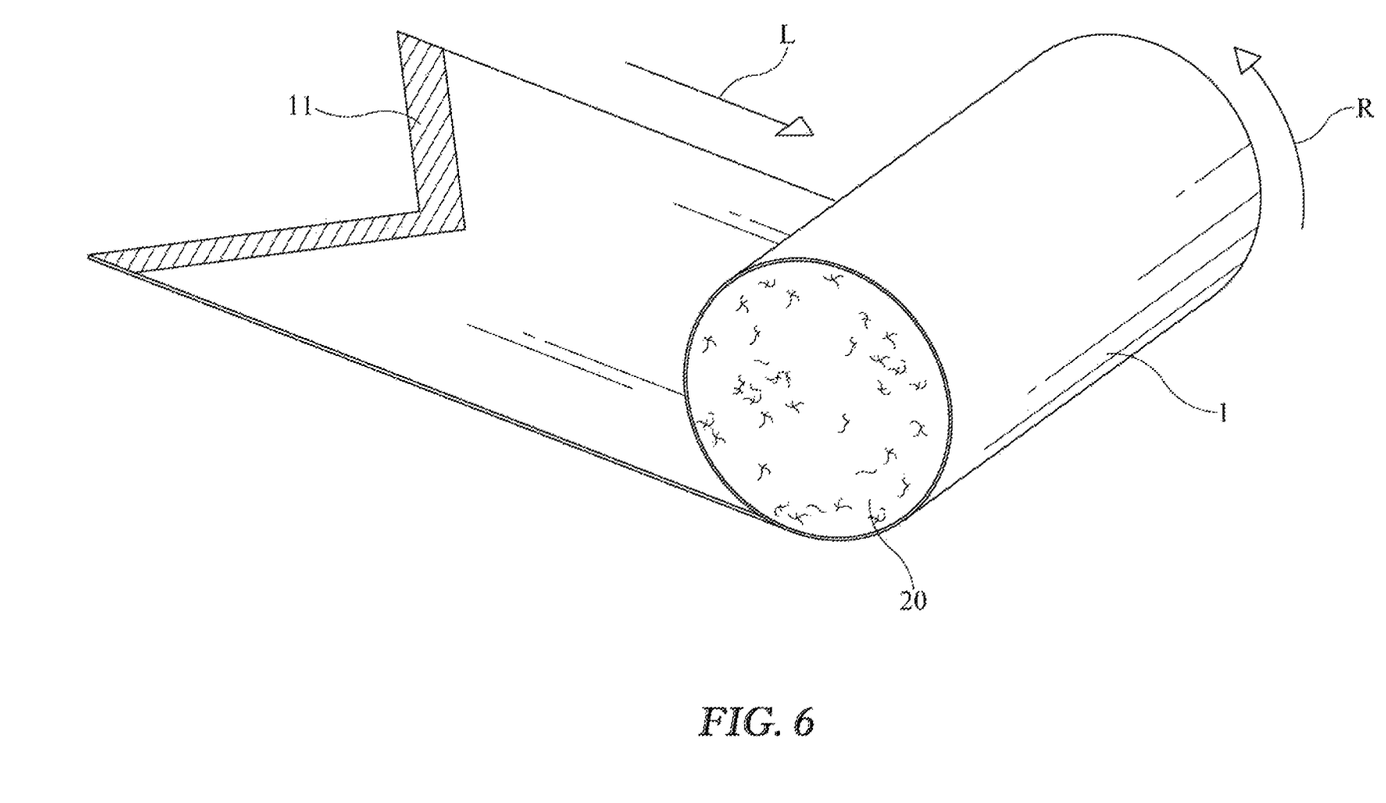
FIG. 6 is a perspective view of a bale undergoing a wrapping cycle, in accordance with one or more of the embodiments described herein.

Now, then, in term of the end result of wrapping, FIG. 6 shows a multi-wound bale of harvested material 20 which can be a harvested agricultural product (such as, but not limited to, cotton). Wrapping segment 1 has a leading end (closer to the bale in FIGS. 1D, 2D) and a trailing end (closer to core 16 in FIGS. 1D, 2D). In FIG. 6, the majority of the wrapping segment is shown encircling the wrap material. (At the conclusion, substantially the entire wrapping segment will be encircling the bale, exclusive of the round ends.) Wrapping materials according to other embodiments discussed herein would be wound in like fashion and to similar effect for the wrapping of any desired solid object or objects. Also, FIG. 6 illustrates that the exposed permanent adhesive can be oriented in various ways relative to the agricultural product. As desired, a user can select which surface of the wrapping segment to place permanent adhesive 11, and the wrapping segment itself can be oriented to approach the agricultural product either from the bottom or from the top when the wrapping cycle is performed in operation.

Figure 7A:
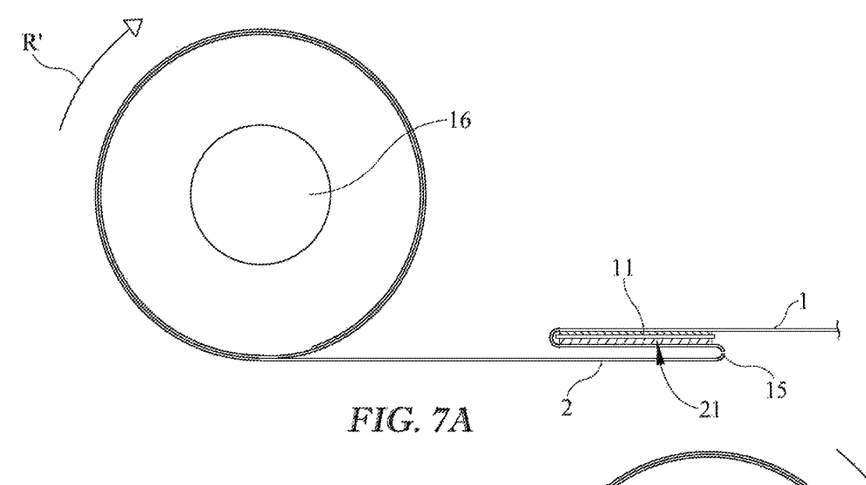
FIGS. 7A and 7B offer a side perspective view of wrapping material being added to a roll arranged around a central core, according to multiple embodiments and alternatives.
Figure 7B:
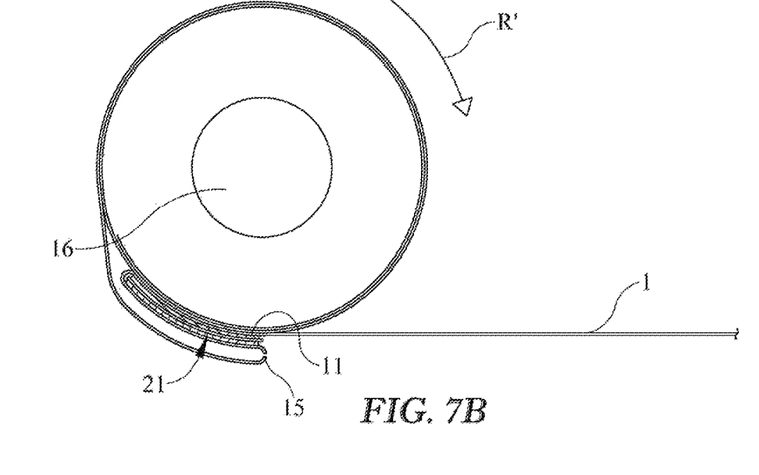

FIGS. 7A and 7B offer a side perspective view of wrapping material being added to a roll situation on a core, according to multiple embodiments and alternatives. FIGS. 7A-B illustrate a winding of a roll on a core, that is a manufacturing phase, in a direction denoted by the rotational arrow R' shown on these figures. In this instance, the type of embodiment is the rotational peel in accordance with FIGS. 2A-C, which will separate the permanent adhesive 11 from release matrix 21 upon unwinding, as the roll is dispensed on the rollers of the harvesting machine, which may include cylinder 19, similar to the unwinding shown in FIG. 2D. As easily, the other approaches of rotational peel (FIGS. 2A and 2B) or overlay (FIG. 3) could have been illustrated for the manufacturing phase.

Figure 8A:
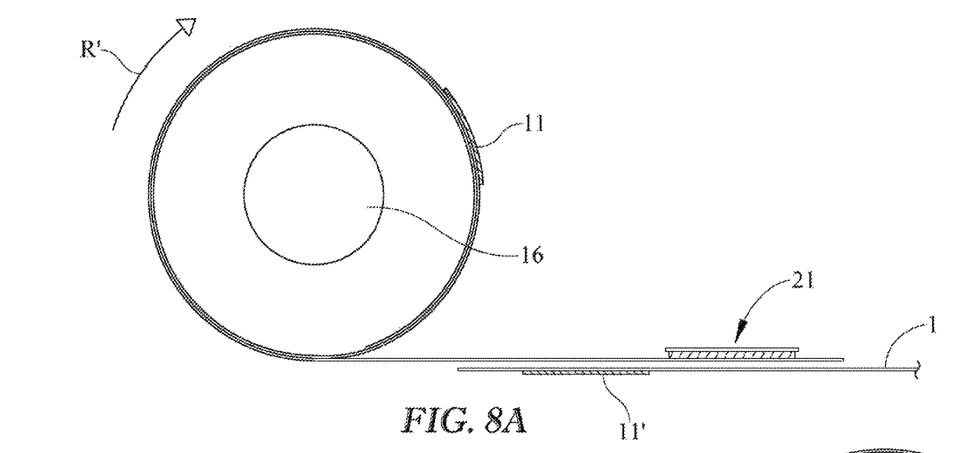
FIGS. 8A and 8B offer a side perspective view of wrapping material being added to a roll arranged around a central core, according to multiple embodiments and alternatives.
Figure 8B:
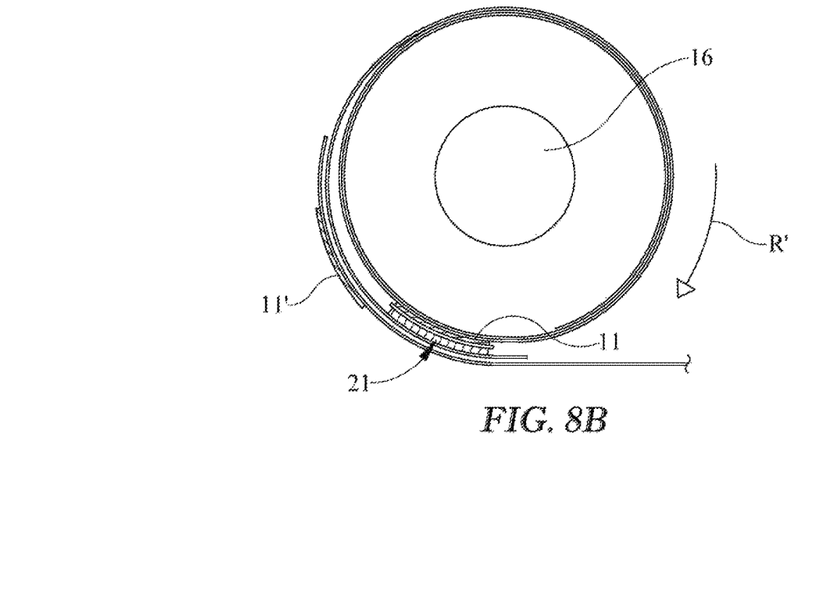

FIGS. 8A and 8B, like FIGS. 7A and 7B, illustrate a manufacturing sequence for a roll containing a plurality of wrapping segments about a central core 16. With FIGS. 8A and 8B, the type of embodiment is an overlay. Wrapping segment 1 contains a release matrix 21 thereon on one of its surfaces, and permanent adhesive 11' on its opposite surface. In FIG. 8A, as it undergoes winding rotation R', the permanent adhesive 11 of a contiguous wrapping segment is seen approaching release matrix 21. On the roll, it is this release matrix that will offer covering protection to permanent adhesive 11 as seen in FIG. 8B. The covering protection of permanent adhesive 11 will remain in place until dispensing and deployment for a later wrapping cycle. In turn, FIG. 8B illustrates permanent adhesive 11' of a contiguous wrapping segment. This permanent adhesive 11' is shown to be briefly exposed during manufacture of the roll, but will rotate around and be received in a covering protective arrangement by a release matrix of another wrapping segment (not shown).

In accordance with the above descriptions, present embodiments require that permanent adhesive 11 is covered by a release layer 12 or release liner 24 until it is ready to be dispensed and deployed for a wrapping cycle. Multiple ways are provided herein for achieving such cover, for separating the permanent adhesive 11 from a release layer 12 or release liner 24, and for separating two contiguous wrapping segment so that a first, active wrapping segment is used for wrapping a harvested material.

It will be understood that the embodiments described herein are not limited in their application to the details of the teachings and descriptions set forth, or as illustrated in the accompanying figures. Rather, it will be understood that the present embodiments and alternatives, as described and claimed herein, are capable of being practiced or carried out in various ways. Also, it is to be understood that words and phrases used herein are for the purpose of description and should not be regarded as limiting. The use herein of such words and phrases as "including," "such as," "comprising," "e.g.," "containing," or "having" and variations of those words is meant to encompass the items listed thereafter, and equivalents of those, as well as additional items.

Accordingly, the foregoing descriptions of several embodiments and alternatives are meant to illustrate, rather than to serve as limits on the scope of what has been disclosed herein. The descriptions herein are not intended to be exhaustive, nor are they meant to limit the understanding of the embodiments to the precise forms disclosed. It will be understood by those having ordinary skill in the art that modifications and variations of these embodiments are reasonably possible in light of the above teachings and descriptions.

What is claimed is:

1. A wrapping material for a product, the wrapping material arranged in a plurality of wrapping segments for placement on a roll arranged around a central core, comprising:
   a first wrapping segment and a second wrapping segment, the wrapping segments being arranged without any folds therein and slidably arranged relative to one another with no perforation therebetween;
   a release layer and a permanent adhesive, the release layer configured for temporary covering of the permanent adhesive, wherein separation of the release layer and the permanent adhesive during unwinding exposes the permanent adhesive, such that upon exposure the permanent adhesive is arranged to complete a wrapping cycle by adhesively connecting opposite ends of a single wrapping segment when the wrapping segment covers at least a portion of the product,
   wherein a non-adhesive distance exists between the permanent adhesive and edges defined by respective trailing and leading ends of the wrapping segments.

2. The wrapping material of claim 1, wherein the plurality of wrapping segments are arranged around a central core to form a roll.

3. The wrapping material of claim 2, wherein the release layer of first and second wrapping segments comprises a matrix formed of an adhesive coating and a release liner, with only a portion of the release liner attached to the adhesive coating, wherein an unattached portion of the release liner is separably positioned between the permanent adhesive of the first wrapping segment and a surface of the second wrapping segment.

4. The wrapping material of claim 1, wherein the permanent adhesive, and the release layer that covers the permanent adhesive temporarily, are positioned on different wrapping segments.

5. A wrapping material for a product, the wrapping material arranged in a plurality of wrapping segments for placement on a roll arranged around a central core, comprising:
   a first wrapping segment and a second wrapping segment, each wrapping segment being formed from a substrate and having a fold prior to unwinding from the roll, and the wrapping segments being releasably attached at a perforation positioned outside the fold of any wrapping segment;
   wherein each wrapping segment has a low friction area characterized by a lower coefficient of friction compared to the substrate;
   a permanent adhesive positioned on the substrate;
   wherein each wrapping segment is arranged with the low friction area and permanent adhesive yet without a release liner positioned within the fold prior to unwinding the wrapping segments from the roll, with the permanent adhesive releasing from the low friction area when the wrapping segments undergo unwinding from the roll.

6. The wrapping material of claim 5, wherein the low friction area comprises a region of silicone positioned on a surface of the substrate.

7. The wrapping material of claim 5, wherein the low friction area comprises a region of polytetrafluoroethylene positioned on a surface of the substrate.

8. The wrapping material of claim 5, wherein the low friction area comprises a region of the substrate impregnated with a polymer chosen from the group consisting of silicone and polytetrafluoroethylene.

9. A wrapping material for a product, the wrapping segment arranged in a plurality of wrapping segments for placement on a roll arranged around a central core, comprising:
   a first wrapping segment and a second wrapping segment arranged around a central core to form a roll, each wrapping segment having a fold prior to unwinding from the roll, and the wrapping segments being releasably attached at a perforation positioned outside the fold of any wrapping segment;
   a release layer and a permanent adhesive, the release layer configured for temporary covering of the permanent adhesive prior to unwinding the wrapping segments from the roll,
   wherein separation of the release layer and permanent adhesive during unwinding exposes the permanent adhesive as the fold comes apart, such that upon exposure the permanent adhesive is arranged to complete a wrapping cycle by adhesively connecting opposite ends of said first wrapping segment when said first wrapping segment covers at least a portion of the product,
   wherein a non-adhesive distance exists between the permanent adhesive and edges defined by respective trailing and leading ends of the first and second wrapping segments, and
   wherein the permanent adhesive, and the release layer that covers the permanent adhesive temporarily, are positioned outside the fold of any wrapping segments and on different wrapping segments, with the permanent adhesive located on the first wrapping segment being temporarily covered by the release layer located on the second wrapping segment.

10. The wrapping material of claim 9, wherein the release layer comprises a matrix formed of an adhesive coating and a release liner.

* * * * *